(12) United States Patent
Dohi et al.

(10) Patent No.: US 11,920,644 B2
(45) Date of Patent: Mar. 5, 2024

(54) REVERSE INPUT CUT-OFF CLUTCH

(71) Applicant: NSK Ltd., Tokyo (JP)

(72) Inventors: Nagao Dohi, Fujisawa (JP); Shohei Kaneko, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/275,724

(22) PCT Filed: Nov. 11, 2022

(86) PCT No.: PCT/JP2022/042069
§ 371 (c)(1),
(2) Date: Aug. 3, 2023

(87) PCT Pub. No.: WO2023/085395
PCT Pub. Date: May 19, 2023

(65) Prior Publication Data
US 2024/0035528 A1    Feb. 1, 2024

(30) Foreign Application Priority Data

Nov. 15, 2021  (JP) ................. 2021-185429
Dec. 27, 2021  (JP) ................. 2021-211833

(51) Int. Cl.
*F16D 43/18*    (2006.01)
*F16D 41/08*    (2006.01)

(52) U.S. Cl.
CPC .......... *F16D 43/18* (2013.01); *F16D 41/08* (2013.01)

(58) Field of Classification Search
CPC ................. F16D 43/18; F16D 41/08
See application file for complete search history.

(56) References Cited

U.S. PATENT DOCUMENTS

| 3,051,282 A | 8/1962 | Greene |
| 3,335,831 A | 8/1967 | Kalns |

(Continued)

FOREIGN PATENT DOCUMENTS

| CN | 112189100 A | 1/2021 |
| CN | 114341517 A | 4/2022 |

(Continued)

OTHER PUBLICATIONS

Notice of Reasons for Refusal dated Jul. 11, 2023 issued by the Japanese Intellectual Property Office in counterpart Japanese Application No. 2023-527264.

(Continued)

*Primary Examiner* — Lori Wu
(74) *Attorney, Agent, or Firm* — Sughrue Mion, PLLC (57) ABSTRACT

In a predetermined first state, a distance ($D_1$) in a second direction between a contact portion ($P_{in}$) between a input-side engaging part (9) and an input-side engaging part (17) and a rotation center (O) is larger than a distance ($D_2$) in the second direction between a contact portion ($P_{out}$) between an output-side engaging part (12) and an output-side engaged part (14) and the rotation center (O). In a locked state or a semi-locked state, a contact portion ($C_1$) between the output-side engaging part (12) and the output-side engaged part (14) is located closer to the rotation center (O) of the output member (4) in a first direction than an imaginary straight line (L) connecting a contact portion ($C_2$) between one pressing surface (13) of the pair of pressing surfaces (13) and a pressed surface (6) to the rotation center (O) of the output member (4).

4 Claims, 6 Drawing Sheets

(56) References Cited

U.S. PATENT DOCUMENTS

| | | |
|---|---|---|
| 2021/0262532 A1 | 8/2021 | Toyoda et al. |
| 2021/0277964 A1 | 9/2021 | Daikoku et al. |
| 2022/0042555 A1 | 2/2022 | Dohi et al. |
| 2022/0205495 A1 | 6/2022 | Dohi et al. |
| 2022/0268331 A1 | 8/2022 | Dohi et al. |

FOREIGN PATENT DOCUMENTS

| | | |
|---|---|---|
| EP | 3792516 A1 | 3/2021 |
| EP | 4006370 A1 | 6/2022 |
| JP | 2011-027252 A | 2/2011 |
| JP | 2013-148118 A | 8/2013 |
| JP | 2017-020612 A | 1/2017 |
| WO | 2019/216280 A1 | 11/2019 |
| WO | 2021/054479 A1 | 3/2021 |
| WO | 2021/054481 A1 | 3/2021 |
| WO | WO-2021054480 A1 * | 3/2021 ............... B60T 8/26 |
| WO | 2021/172558 A1 | 9/2021 |

OTHER PUBLICATIONS

Decision to Grant a Patent dated Sep. 26, 2023 issued by the Japanese Intellectual Property Office in counterpart Japanese Application No. 2023-527264.
United States Office Action dated Oct. 13, 2023 in U.S. Appl. No. 18/039,565.
International Search Report for PCT/JP2022/040425 dated Dec. 13, 2022.
Written Opinion for PCT/JP2022/040425 dated Dec. 13, 2022.
Korean Office Action—Notice of Allowance for KR 10-2023-7011974 dated May 10, 2023.
International Search Report for PCT/JP2022/042069 dated Dec. 20, 2022.
Written Opinion for PCT/JP2022/042069 dated Dec. 20, 2022.

* cited by examiner

REVERSE INPUT CUT-OFF CLUTCH

CROSS REFERENCE TO RELATED APPLICATIONS

This application is a National Stage of International Application No. PCT/JP2022/042069 filed Nov. 11, 2022, claiming priority based on Japanese Patent Application No. 2021-185429 filed Nov. 15, 2021 and Japanese Patent Application No. 2021-211833 filed Dec. 27, 2021.

TECHNICAL FIELD

The present invention relates to a reverse input cut-off clutch which, in a rotational torque input to an input member which is transmitted to an output member, fully cuts oft' a rotational torque reversely input to the output member so that the reversely-input rotational torque is not transmitted to the input member or partially cuts off the reversely-input rotational torque so that only a portion thereof is transmitted to the input member.

BACKGROUND ART

Reverse input cut-off clutches include an input member connected to an input-side mechanism such as a drive source and an output member connected to an output-side mechanism such as a speed reduction mechanism and has a function of, in a rotational torque input to an input member which is transmitted to an output member, fully cutting off a rotational torque reversely input to the output member so that the reversely-input rotational torque is not transmitted to the input member or partially cutting off the reversely-input rotational torque so that only a portion thereof is transmitted to the input member.

Reverse input cut-off clutches are roughly classified into a lock type and a free type in accordance with a difference in mechanism which cuts off a rotational torque reversely input to an output member. The lock-type reverse input cut-off clutch includes a mechanism which prevents the rotation of an output member when a rotational torque is reversely input to the output member. On the other hand, the free-type reverse input cut-off clutch includes a mechanism which allows an output member to idle when a rotational torque is input to the output member. The selection of the reverse input cut-off clutch to be used of the lock-type reverse input cut-off clutch and the free-type reverse input cut-off clutch is appropriately determined in accordance with the use or the like of a device having the reverse input cut-off clutch incorporated therein.

PCT International Publication No. WO 2021/054481 pamphlet describes a lock-type reverse input cut-off clutch. The reverse input cut-off clutch described in the PCT International Publication No. WO 2021/054481 pamphlet includes an input member having a pair of input-side engaging parts, an output member having an output-side engaging part, a pressed member having a pressed surface, and an engaging element having an engaging element main body and a link member. The engaging element main body has an output-side engaged part which engages with the output-side engaging part and a swing support part which is located closer to the pressed surface than the input-side engaging parts. Furthermore, the link member has a first end portion swingably joined to the swing support part and a second end portion swingably joined to the input-side engaging parts.

In the reverse input cut-off clutch described in the PCT International Publication No, WO 2021/054481 pamphlet, if a rotational torque is input to the input member, the engaging element displaces away from the pressed surface by pulling the swing support part via the link member using the input-side engaging parts and engages the output-side engaged part with the output-side engaging part to transmit the rotational torque which has been input to the input member to the output member.

On the other hand, if a rotational torque is reversely input to the output member, the pressing surface is frictionally engaged with the pressed surface by pressing the pressing surface against the pressed surface on the basis of the engagement between the output-side engaging part and the output-side engaged part.

According to the reverse input cut-off clutch described in the PCT International Publication No, WO 2021/054481 pamphlet, when a rotational torque is input to the input member, it is possible to smoothly switch from a state in which the pressing surface is pressed against the pressed surface (locked state or semi-locked state) to a state in which the pressing surface is separated from the pressed surface (unlocked state or semi-unlocked state).

SUMMARY OF INVENTION

Technical Problem

Since the reverse input cut-off clutch described in the PCT International Publication No. WO 2021/054481 pamphlet has a constitution in which the engaging element has the engaging element main body and the link member, a large number of parts are provided, parts management and assembly costs are high, and thus production costs are high.

The present invention was made in view of the above circumstances, and an object of the present invention is to realize a structure of a reverse input cut-off clutch in which, when a rotational torque is input to an input member, it is possible to smoothly switch from a state in which a pressing surface is pressed against a pressed surface (locked state or semi-locked state) to a state in which the pressing surface is separated from the pressed surface (unlocked state or semi-unlocked state) and it is possible to minimize production costs.

Solution to Problem

A reverse input cut-off clutch according to an aspect of the present invention includes a pressed member, an input member, an output member, and an engaging element.

The pressed member includes a pressed surface provided on an inner peripheral surface.

The input member has at least one input-side engaging part disposed radially inside of the pressed surface and is disposed coaxially with the pressed surface.

The output member has an output-side engaging part disposed further inward in a radial direction than the input-side engaging part radially inside the pressed surface and is disposed coaxially with the pressed surface.

The engaging element has a pair of pressing surfaces facing the pressed surface and separated from each other in a circumferential direction, an input-side engaged part which is engageable with the input-side engaging part, and an output-side engaged part which is engageable with the output-side engaging part and is disposed to be movable in a first direction that is a direction of coming closer or moving away with respect to the pressed surface.

Also, the engagement element is configured to be displaced in a direction moving away from the pressed surface in the first direction based on that the input side engaging portion engages with the input side engaged portion when the rotational torque is input to the input member and is configured to transmit a rotational torque input to the input member to the output member based on that the output side engaged portion engages with the output side engaging portion. In addition, the engagement element is configured to press the pressing surface against the pressed surface so that the pressing surface frictionally engages with the pressed surface based on that the output side engaging portion engages with the output side engaged portion when a rotational torque is reversely input to the output member.

Particularly, in a reverse input cut-off clutch according to an aspect of the present invention, in a state in which, as the output member rotates in a predetermined direction, the pair of pressing surfaces are pressed against the pressed surface, and as the input member rotates in a direction opposite to the predetermined direction, the input-side engaging part is engaged with the input-side engaged part, a distance between the contact portion between the input-side engaging part and the input-side engaging part and the rotation center of the input member in the second direction perpendicular to both of the first direction and the rotation center of the input member is larger than a distance between the contact portion between the output-side engaging part and the output-side engaged part and the rotation center of the output member in the second direction.

Also, in a state in which a rotational torque is reversely input to the output member and the pair of pressing surfaces are in contact with the pressed surface, the contact portion between the output-side engaging part and the output-side engaged part is located closer to the rotation center of the output member in the first direction than the imaginary straight line connecting the contact portion between one pressing surface of the pair of pressing surface and the pressed surface to the rotation center of the output member.

A reverse input cut-off clutch according to an aspect of the present invention can include a pair of the engaging elements and the input member can have a pair of the input-side engaging parts.

Advantageous Effects of Invention

According to a reverse input cut-off clutch relating to an aspect of the present invention, when a rotational torque is input to an input member, it is possible to smoothly switch from a state in which a pressing surface is pressed against a pressed surface (locked state or semi-locked state) to a state in which the pressing surface is separated from the pressed surface (unlocked state or semi-unlocked state) and it is possible to minimize production costs.

DESCRIPTION OF EMBODIMENTS

An example of an embodiment will be described with reference to FIGS. 1 to 6B. Unless otherwise specified, an axial direction, a radial direction, and a circumferential direction refer to an axial direction, a radial direction, and a circumferential direction of a reverse input cut-off clutch 1. In this example, the axial direction, the radial direction, and the circumferential direction of the reverse input cut-off clutch 1 coincide with an axial direction, a radial direction, and a circumferential direction of an input member 3 and coincide with an axial direction, a radial direction, and a circumferential direction of an output member 4. Furthermore, one side in the axial direction refers to the input member 3 side (right side in FIG. 2) and the other side in the axial direction refers to the output member 4 side (left side in FIG. 2).

Explanation of Structure of Reverse Input Cut-Off Clutch

The reverse input cut-off clutch 1 of this example includes a pressed member 2, the input member 3, the output member 4, and a pair of engaging elements 5. The reverse input cut-off clutch 1 has a reverse input cut-off function of, in transmission of a rotational torque input to the input member 3 to the output member 4, fully cutting off a rotational torque reversely input to the output member 4 so that the reversely-input rotational torque is not transmitted to the input member 3 and partially cutting off the reversely-input rotational torque so that only a portion thereof is transmitted to the input member 3. Although a case in which a rotation direction of the input member 3 is mainly counterclockwise and a case in which a rotation direction of the output member 4 is clockwise will be explained as an example in the following, explanation, the present invention is not limited thereto. That is to say the reverse input cut-off clutch 1 of this example can perform cutting off (lock operation on) the reversely-input rotational torque and an unlock operation regardless of a rotation direction (torque input direction).

The pressed member 2 has a cylindrical shape and is fixed to another member (not shown) such as a housing or provided integrally with another member so that the rotation thereof is restricted. The pressed member 2 has a pressed surface 6 that is a cylindrical concave surface in an inner circumferential surface.

The input member 3 is connected to an input-side mechanism such as an electric motor and receives a rotational torque as an input. The input member 3 has a substrate part 7, an input shaft part 8, and a pair of input-side engaging parts 9.

The substrate part 7 has a substantially circular end surface shape when viewed from the axial direction.

The input shaft part 8 protrudes from a central portion of one side surface of the substrate part 7 in the axial direction toward one side thereof in the axial direction. The input shaft part 8 has, on one side portion in the axial direction, an input-side connecting part 10a configured to connect the input shaft part 8 to an output part of the input-side mechanism so that torque can be transmitted. In this example, the input-side connecting part 10a has a width across flat shape including a pair of flat surfaces parallel to each other on an outer circumferential surface. Here, the input-side connecting part 10a may have any shape as long as it can be connected to an output part of the input-side mechanism so that torque can be transmitted.

The pair of input-side engaging parts 9 have a substantially fan-shaped or substantially trapezoidal end surface shape when viewed from the axial direction and protrude from two positions on the other side surface in the axial direction of the substrate part 7 on the opposite side in the radial direction toward the other side in the axial direction. The pair of input-side engaging parts 9 are away from each other in the radial direction of the input member 3. For this reason, each of the input-side engaging parts 9 is disposed at a portion of the other side surface in the axial direction of the substrate part 7 which is outwardly away in the radial direction from a rotation center O. Furthermore, the input-side engaging parts 9 have a shape in which they are symmetrical in the circumferential direction.

In this example, radial inner surfaces 9a of the input-side engaging parts 9 are configured of flat surfaces parallel to each other and a radial outer surface 9b of each of the input-side engaging parts 9 has a contour shape having a cylindrical surface shape that is the same as that of the outer circumferential surface of the substrate part 7. Furthermore, a pair of circumferential side surfaces 9c of each of the input-side engaging parts 9 is configured of flat surfaces which are inclined in a direction in which they separate from each other outward in the radial direction.

The output member 4 is connected to the output-side mechanism such as a speed reduction mechanism and outputs a rotational torque. The output member 4 is disposed coaxially with the input member 3. In this example, the output member 4 has an output shaft part 11 and an output-side engaging part 12.

The output shaft part 11 has, at one end portion in the axial direction, a flange part 18 protruding outward in the radial direction and, at the other end portion in the axial direction, an output-side connecting part 10b configured to connect the output shaft part 11 to the input part of the output-side mechanism so that torque can be transmitted. In this example, the output-side connecting pall 10b has a width across flat shape including a pair of flat surfaces parallel to each other on the outer circumferential surface. Here, the output-side connecting part 10b may have any shape as long as it can be (connected to the input part of the output-side mechanism so that torque can be transmitted.

The output-side engaging part 12 has a cam function. That is to say, a distance from the rotation center O of the output member 4 to the outer circumferential surface of the output-side engaging part 12 is not constant in the circumferential direction. In this example, the output-side engaging part 12 has a substantially rectangular or substantially elliptical end surface shape when viewed in the axial direction and protrudes from a center portion of one end surface in the axial direction of the output shaft part 11 toward one side in the axial direction. That is to say, the outer circumferential surface of the output-side engaging part 12 is composed of a pair of flat surfaces 12a parallel to each other and a pair of convex surfaces 12b each having a partially cylindrical surface shape. For this reason, a distance from the rotation center O of the output member 4 to the outer circumferential surface of the output-side engaging part 12 is not constant in the circumferential direction. In this example, the pair of convex surfaces 12b are composed of partial cylindrical surfaces centering on the rotation center O of the output member 4.

The output-side engaging part 12 is surface-symmetrical with respect to a virtual plane passing through the rotation center O of the output member 4 and perpendicular to the pair of flat surfaces 12a and surface-symmetrical with respect to a virtual plane passing through the rotation center O of the output member 4 and parallel to the pair of flat surfaces 12a. Such an output-side engaging part 12 is disposed in a portion between the pair of input-side engaging parts 9.

The pair of engaging elements 5 have a substantially semi-circular end surface shape when viewed from the axial direction and have a shape in which they are symmetrical with respect to the width direction is direction parallel to a flat surface portion 15 which will be described later and a direction indicated by an arrow B in FIG. 3).

Each of the pair of engaging elements 5 has, on the radial outer surface, a pair of pressing surfaces 13 which face the pressed surface 6 and are separated from each other in the circumferential direction. Each of the pressing surfaces 13 is composed of a convex surface having a partially cylindrical surface shape having a radius of curvature smaller than a radius of curvature of the pressed surface 6. A portion of the radial outer surface of the pair of engaging elements 5 which is away in the circumferential direction from the pair of pressing surfaces 13 has, as a center, a central axis O of the input member 3 and is present further inward in the radial direction than a virtual circle in contact with the pair of pressing surfaces 13 when viewed from the axial direction. That is to say, a portion of the radial outer surface of the pair of engaging elements 5 which is away from in the circumferential direction from the pair of pressing surfaces 13 while the pair of pressing surfaces 13 are in contact with the pressed surface 6 is not in contact with the pressed surface 6.

It is preferable that each of the pressing surfaces 13 have a surface texture having a larger coefficient of friction with respect to the pressed surface 6 than other portions of the engaging elements 5. Furthermore, each of the pressing surfaces 13 can be configured integrally with the other portions of the engaging elements 5 or can also be formed on a surface of a friction material fixed to the other portions of the engaging elements 5 through sticking, bonding, or the like.

Also, each of the pair of engaging elements 5 has an output-side engaged part 14 which can be engaged with the output-side engaging part 12 at a central portion in the width direction of the radial inner surface. In this example, a flat surface portion 15 is provided on the radial inner surface of each of the pair of engaging elements 5 and a pair of convex portions 16 protruding inward in the radial direction are provided at two positions in the width direction of the flat surface portion 15. Furthermore, the output-side engaged part 14 is formed of a portion of the flat surface portion 15 which is present between the pair of convex portions 16 in the width direction. In this example, a dimension in the width direction of the output-side engaged part 14 (a gap between the pair of convex portions 16) is larger than a dimension in the width direction of the flat surface 12a of the output-side engaging part 12.

Figure 1:
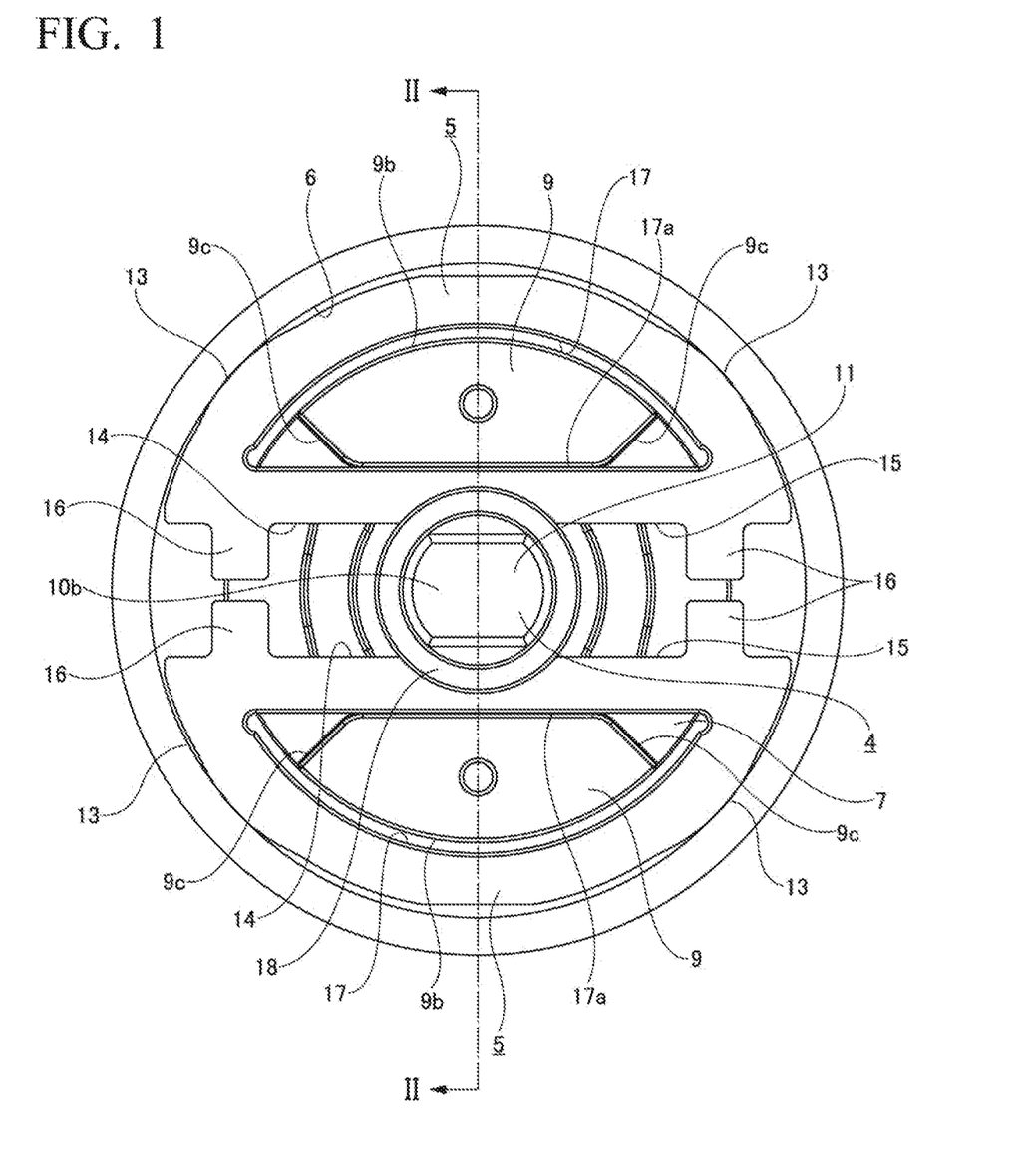
FIG. 1 is an end surface diagram of a reverse input cut-off clutch according to an example of an embodiment when viewed from an output member side.
Figure 2:
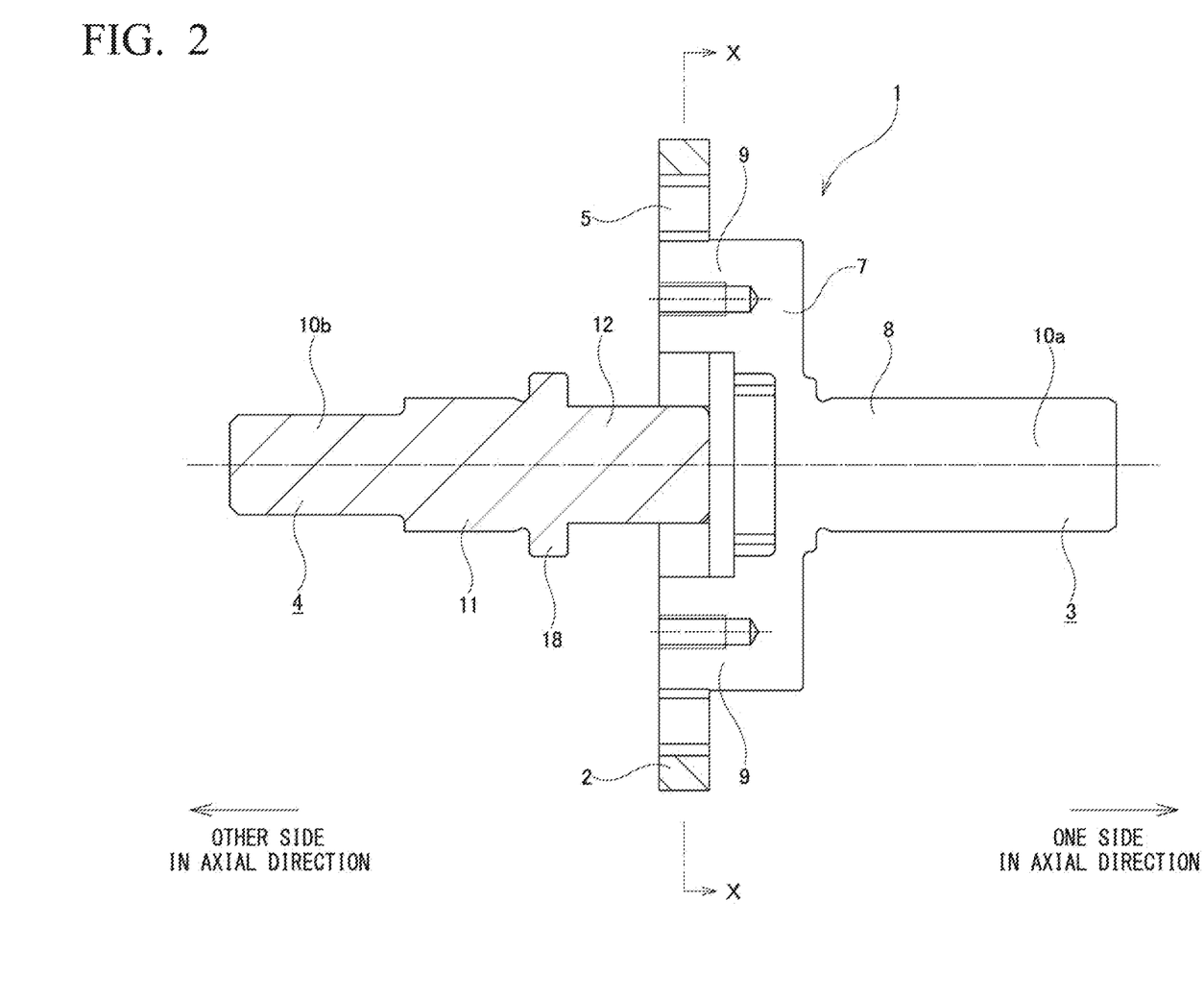
FIG. 2 is a cross-sectional view taken along line 1141 of FIG. 1.
Figure 3:
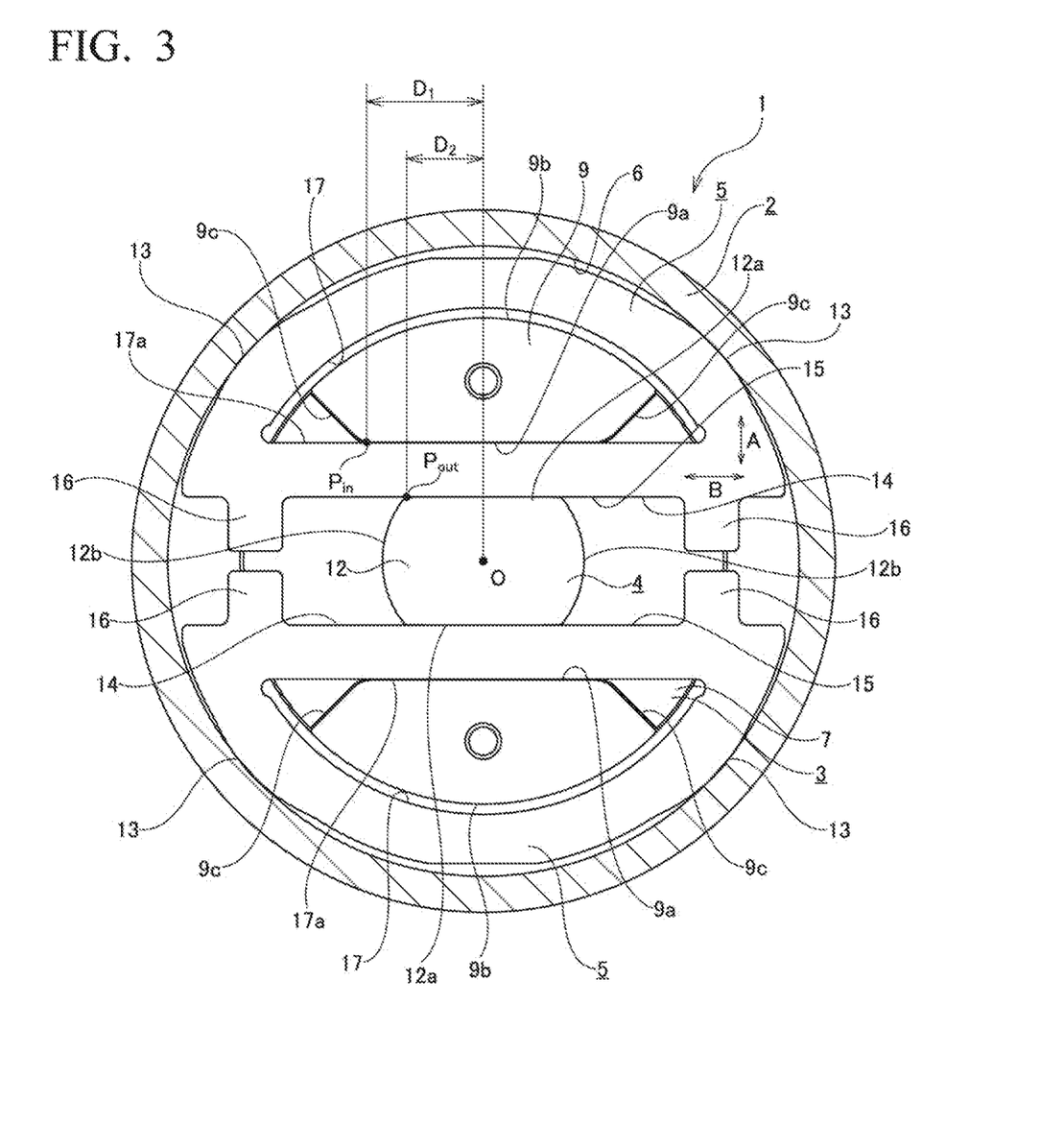
FIG. 3 is a cross-sectional view taken along line X-X of FIG. 2.

A radial direction with respect to each of the engaging elements 5 refers to a direction perpendicular to the flat surface portion 15 indicated by an arrow A in FIG. 3 and a width direction with respect to each of the engaging elements 5 refers to a direction parallel to the flat surface portion 15 indicated by an arrow B in FIG. 3. In this example, the radial direction with respect to each of the engaging elements 5 corresponds to a first direction which is a far-near direction of each of the pair of pressing surfaces 13 of the engaging element 5 with respect to the pressed surface 6. In addition, a width direction with respect to each of the engaging elements 5 corresponds to a second direction perpendicular to both of the first direction and the rotation center O of the input member 3.

In addition, each of the pair of engaging elements 5 has an input-side engaged part 17 which can be engaged with each of the input-side engaging parts 9 at an intermediate portion in the radial direction of the central portion in the width direction. In this example, the input-side engaged part 17 has a substantially arcuate opening shape when viewed from the axial direction and is formed of a through hole which axially passes through the intermediate portion in the radial direction at the central position in the width direction of the engaging element 5. The input-side engaged part 17 has a size in which the input-side engaging part 9 is able to be loosely inserted therein. Thus, in a state in which the input-side engaging part 9 is inserted inside the input-side engaged part 17, there are gaps between the input-side engaging part 9 and an inner surface of the input-side engaged part 17 in the width direction and in the radial direction of the engaging element 5. For this reason, the input-side engaging part 9 can displace in a direction in which the input member 3 rotates with respect to the input-side engaged part 17 (engaging element 5) and the input-side engaged part 17 can displace in the radial direction of the engaging element 5 with respect to the input-side engaging part 9. In this example, the input-side engaged part 17 has a flat surface 17a which is parallel to the flat surface portion 15 on the radial inner surface (surface facing outward in the radial direction).

When carrying out the present invention, the input-side engaged part can also be constituted of a bottomed hole which opens only in one side surface of the engaging element in the axial direction. Alternatively, the input-side engaged part can also be constituted of a cutout which opens in the radial outer surface of the engaging element.

In the reverse input cut-off clutch 1 in this example, in a state in which the pair of pressing surfaces 13 of the engaging elements 5 are directed to sides opposite to each other in the radial direction and the radial inner surfaces (flat surface portions 15) of the engaging elements 5 face each other, the pair of engaging elements 5 are disposed radially inside the pressed member 2 so that the pair of engaging elements 5 can move in the radial direction (first direction). Furthermore, the pair of input-side engaging parts 9 of the input member 3 disposed on one side in the axial direction are axially inserted into the input-side engaged parts 17 of the pair of engaging elements 5 and the output-side engaging part 12 of the output member 4 disposed on the other side in the axial direction is axially inserted between the pair of output-side engaged parts 14. That is to say, the pair of engaging elements 5 are disposed so that the output-side engaging part 12 is disposed between the output-side engaged parts 14 from the outside in the radial direction.

In a state in which the pair of engaging elements 5 are disposed radially inside the pressed member 2, an inner diameter dimension of the pressed member 2 and a radial dimension of each of the engaging elements 5 are regulated so that there is a gap in at least one of portions between the pressed surface 6 and the pair of pressing surfaces 13 and a portion between distal end surfaces of the convex portions 16.

Explanation of Operation of Reverse Input Cut-Off Clutch

Figure 4:
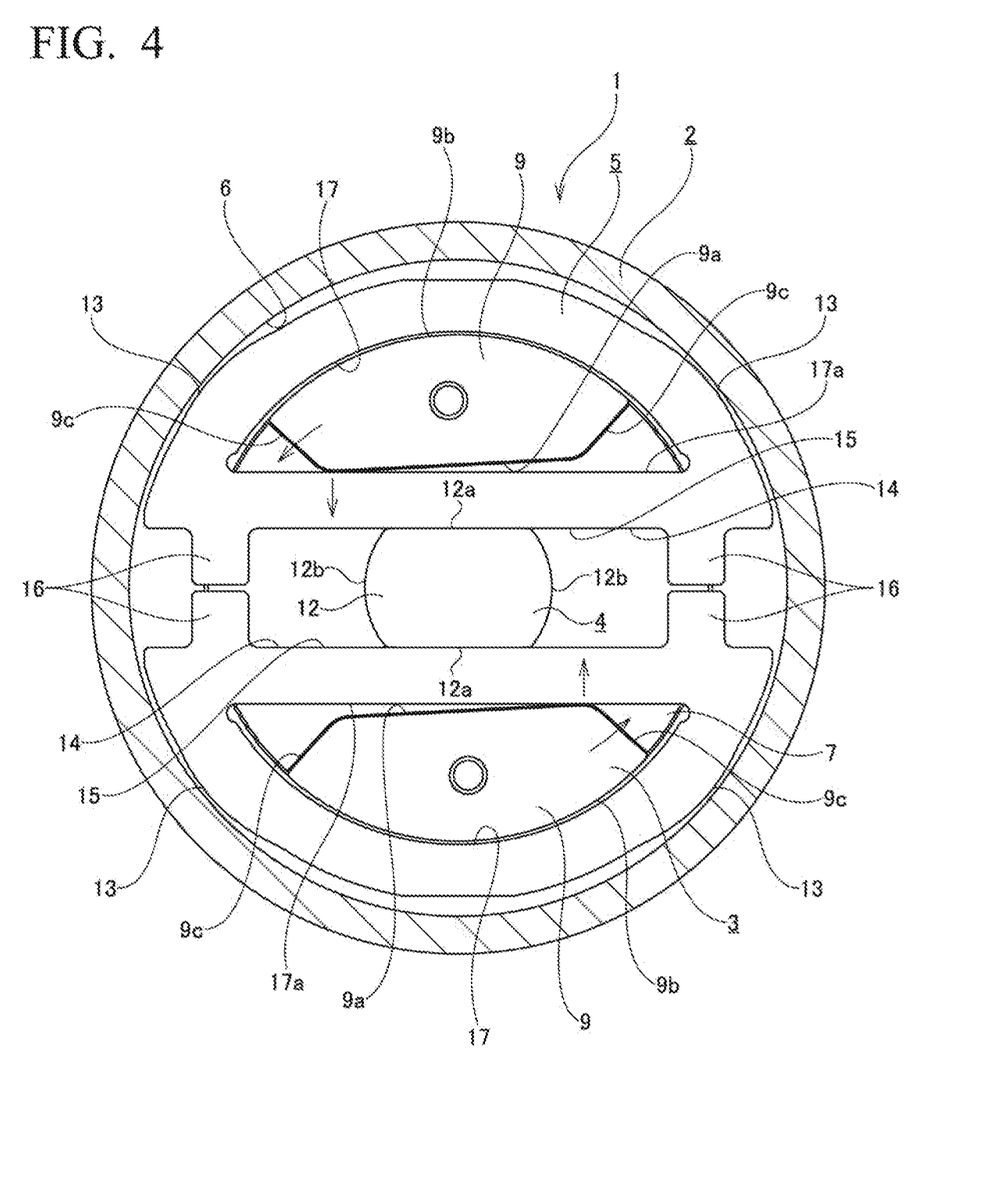
FIG. 4 is a diagram similar to FIG. 1 showing a state in which a rotational torque is input to an input member in the reverse input cut-off clutch according to the example of the embodiment.
Figure 5:
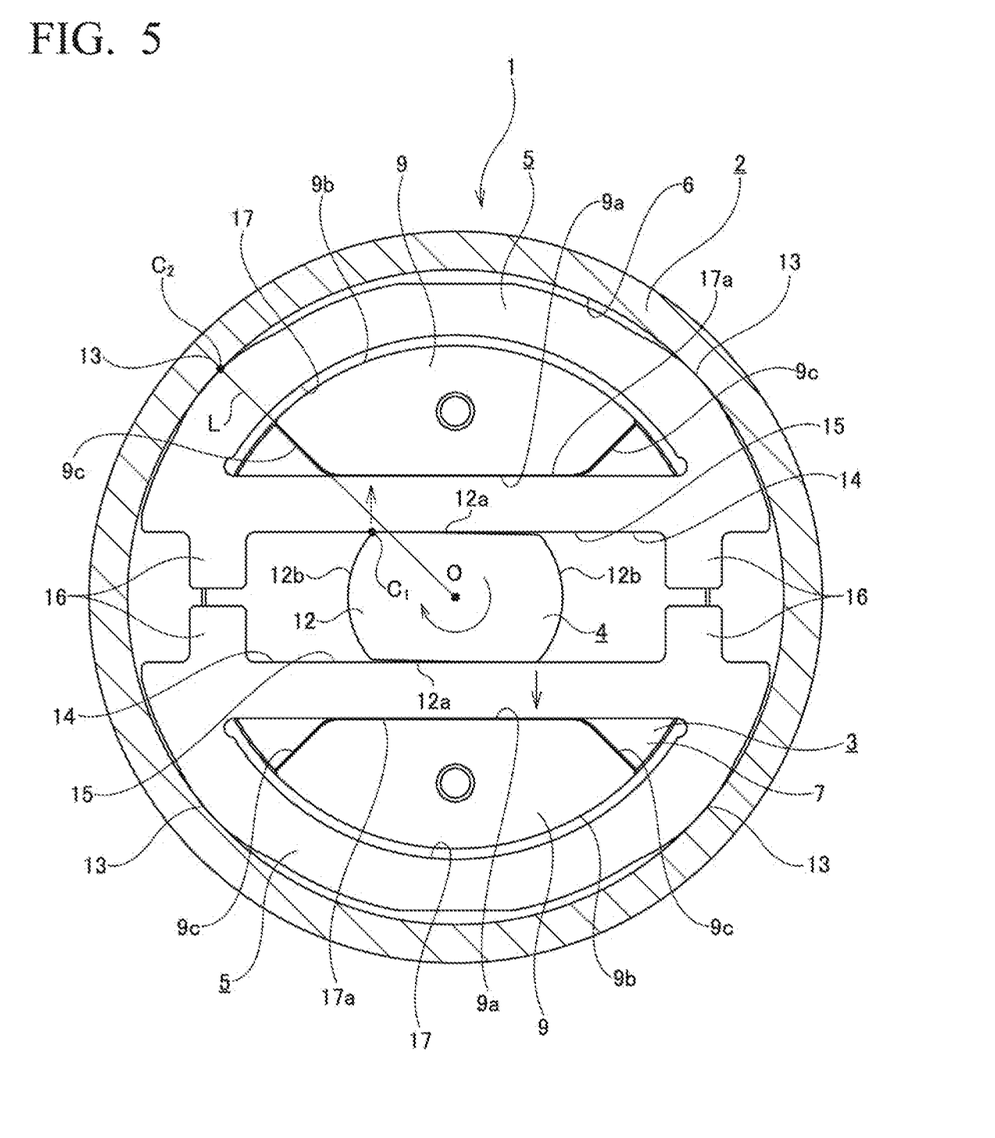
FIG. 5 is a diagram similar to FIG. 3, showing a state in which a rotational torque is reversely input to an output member in the reverse input cut-off clutch according to the example of the embodiment.

An operation of the reverse input cut-off clutch 1 in this example will be explained with reference to FIGS. 4 and 5. FIGS. 4 and 5 exaggeratedly show a gap in the radial direction between the input member 3 and the output member 4 and the pair of engaging elements 5.

First, a case in which a rotational torque is input from the input-side mechanism to the input member 3 will be explained.

If a rotational torque is input to the input member 3, as shown in FIG. 4, the input-side engaging part 9 rotates inside the input-side engaged part 17 in a direction in which the input member 3 rotates (counterclockwise direction in the example of FIG. 4). Thus, the radial inner surfaces 9a of the input-side engaging parts 9 press the flat surfaces 17a of the input-side engaged parts 17 inward in the radial direction to move the pair of engaging elements 5 so that the pair of engaging elements 5 are moved in a direction in which the engaging elements 5 are separated from the pressed surface 6. That is to say, the pair of engaging elements 5 are moved toward a radial inside that is a direction in which they approach each other (so that the engaging element 5 located on the upper side of FIG. 4 faces downward and so that the engaging element 5 located on the lower side of FIG. 4 faces upward) on the basis of the engagement between the pair of engaging elements 5 and the input member 3. Thus, the radial inner surfaces of the pair of engaging elements 5 move in a direction in which they approach each other and the output-side engaging part 12 of the output member 4 is disposed between the pair of output-side engaged parts 14 from both sides in the radial direction. That is to say, the output-side engaging part 12 is engaged (brought into contact) with the pair of output-side engaged part 14 without looseness while rotating the output member 4 so that the flat surface 12a of the output-side engaging part 12 is parallel to the flat surface portion of the engaging element 5. As a result, the rotational torque input to the input member 3 is transmitted to the output member 4 via the pair of engaging elements 5 and output from the output member 4. In the reverse input cut-off clutch 1 in this example, if the rotational torque is input to the input member 3, the pair of engaging elements 5 are moved in the direction in which they are away from the pressed surface 6, regardless of the direction in which the input member 3 rotates. Moreover, the rotational torque input to the input member 3 is transmitted to the output member 4 via the pair of engaging elements 5.

A case in which a rotational torque is reversely input from the output-side mechanism to the output member 4 will be described below.

If the rotational torque is reversely input to the output member 4, as shown in FIG. 5, the output-side engaging part 12 rotates inside the pair of output-side engaged parts 14 in the direction in which the output member 4 rotates (clockwise direction in the example of FIG. 5). Thus, a connection portion (corner portion) between the flat surfaces 12a and the convex surfaces 12b of the outer circumferential surface of the output-side engaging part 12 presses the output-side engaged part 14 outward in the radial direction to move the pair of engaging elements 5 in a direction in which they approach the pressed surface 6. That is to say, the pair of engaging elements 5 are moved toward a radial outside that is a direction in which they are separated from each other (so that the engaging element 5 located on the upper side of FIG. 5 faces upward and so that the engaging element 5 located on the lower side of FIG. 5 faces downward) on the basis of the engagement between the pair of engaging elements 5 and the output member 4. Thus, the pressing surfaces 13 of the pair of engaging elements 5 are brought into frictional engagement with the pressed surface 6.

As a result, the rotational torque which is reversely input to the output member 4 is fully cut off and is not transmitted to the input member 3 or only a part of the rotational torque which is reversely input to the output member 4 is transmitted to the input member 3 so that the rotational torque is partially cut off. In order to fully cut off the rotational torque which is reversely input to the output member 4 and prevent the rotational torque from being transmitted to the input member 3, the pair of engaging elements 5 are stretched between the output-side engaging part 12 and the pressed member 2 so that the pair of pressing surfaces 13 do not slide (relatively rotate) with respect to the pressed surface 6 and thus the output member 4 is locked. On the other hand, in order to transmit only a part of the rotational torque which is reversely input to the output member 4 to the input member 3 and partially cut off the rotational torque, the pair of engaging elements 5 are stretched between the output-side engaging part 12 and the pressed member 2 so that the pair of pressing surfaces 13 slide with respect to the pressed surface 6 and thus the output member 4 is semi-locked.

In the reverse input cut-off clutch 1 in this example, the sizes of the gaps between the constituent elements are adjusted so that the above operations are possible. Particularly, in a positional relationship in which the pair of pressing surfaces 13 of each of the engaging elements 5 are in contact with the pressed surface 6, a gap exists to allow the pair of pressing surfaces 13 to be further pressed toward the pressed surface 6 on the basis of the fact that the corner portion of the output-side engaging part 12 presses the output-side engaged part 14 between the radial inner surface 9a of the input-side engaging part 9 and the inner surface of the input-side engaged part 17. Thus, when the rotational torque is reversely input to the output member 4, the prevention of the movement of the engaging element 5 outward in the radial direction due to the input-side engaging part 9 is prevented. In addition, also after the pair of pressing surfaces 13 are in contact with the pressed surface 6, the output member 4 is appropriately locked or semi-locked by changing surface pressures acting on the contact portions between the pair of pressing surfaces 13 and the pressed surface 6 in accordance with the magnitude of the rotational torque which is reversely input to the output member 4.

Also, in the reverse input cut-off clutch 1 in this example, the size and the shape of each part of the pressed member 2, the input member 3, the output member 4, and the pair of engaging elements 5 are regulated to satisfy the following relationship.

First, as the output member 4 rotates in a predetermined direction (for example, clockwise direction of FIG. 3), the pair of pressing surfaces 13 are pressed against the pressed surface 6. In addition, as the input member 3 rotates in a direction opposite to the predetermined direction (for example, counterclockwise direction in FIG. 3), a first distance D1 that is a distance in the second direction between a contact portion Pin between the input-side engaging parts 9 and the input-side engaged part 17 and the rotation center O of the input member 3 is made larger than a second distance D2 in the second direction between a contact portion Pout between the output-side engaging part 12 and the output-side engaged part 14 and the rotation center O of the output member 4 (D1>D2) in a state in which the input-side engaging parts 9 are engaged with the input-side engaged part 17 (a part of the input-side engaging part 9 is in contact with the input-side engaged part 17) (first state in the claims).

Also, as shown in FIG. 5, in a state in which the rotational torque is reversely input to the output member 4 and the pair of pressing surfaces 13 of each of the engaging elements 5 are in contact with the pressed surface 6 (locked state or semi-locked state) (second state in the claims), a contact portion C1 between the output-side engaging part 12 and the output-side engaged part 14 is located on a side (the lower side of FIG. 5) closer to the rotation center O of the output member 4 in the first direction than an imaginary straight line L connecting a contact portion C2 between one pressing surface 13 (on a side closer to the contact portion C1 than the rotation center O of the output member 4 in the second direction) of the pair of pressing surfaces 13 and the pressed surface 6 to the rotation center O of the output member 4.

According to the reverse input cut-off clutch 1 in this example, the dimension in the axial direction can be shortened and the number of parts can be reduced.

The reverse input cut-off clutch 1 in this example converts the rotation of each of the input member 3 and the output member 4 into the movement in the radial direction of each of the engaging elements 5. Furthermore the engaging element 5 is engaged with the output member 4 located radially inside the engaging element 5 or the engaging element 5 is pressed against the pressed member 2 located radially outside of the engaging element 5 by converting the rotation of the input member 3 and the output member 4 into the movement in the radial direction of the engaging element 5 in this way. Thus, in the reverse input cut-off clutch in this example, an unlocked state or a semi-unlocked state of the output member 4 in which a rotational torque can be transmitted from the input member 3 to the output member 4 and a locked state or a semi-locked state of the output member 4 in which the rotation of the output member 4 is prevented or minimized can be switched on the basis of the movement in the radial direction of the engaging element 5 controlled through the rotation of each of the input member 3 and the output member 4, Therefore, the dimension in the axial direction of the entire device of the reverse input cut-off clutch 1 can be shortened.

Moreover, the engaging element 5 has both a function of transmitting the rotational torque which is input to the input member 3 to the output member 4 and a, function of locking or semi-locking the output member 4. For this reason, the number of parts of the reverse input cut-off clutch 1 can be reduced. In addition, an operation can be stabilized as compared with a case in which separate members have the function of transmitting a rotational torque and the function of performing locking or semi-locking. For example, when the function of transmitting a rotational torque and the function of performing locking or semi-locking are provided to separate members, the timing of performing unlocking or semi-unlocking and the timing of starting transmission of a rotational torque are likely not to match. In this case, if a rotational torque is reversely input to the output member during the period from unlocking or semi-unlocking to the start of transmission of the rotational torque, the output member is again locked or semi-locked. In this example, since the engaging element 5 has both of the function of transmitting a rotational torque to the output member 4 and the function of locking or semi-locking the output member 4, it is possible to prevent such inconvenience from occurring.

Also, since a direction of a force acting on the engaging element 5 from the input member 3 is opposite to a direction of a force acting on the engaging element 5 from the output member 4, a direction in which the engaging element 5 moves can be controlled by regulating a magnitude relationship between the two forces. For this reason, a switching operation between the locked state or the semi-locked state and the unlocked or semi-unlocked state of the output member 4 can be performed stably and reliably.

Furthermore, in the reverse input cut-off clutch 1 in this example, the first distance $D_1$ is made lager than the second distance $D_2$ ($D_1 > D_2$). Thus, rattling in the direction in which the input member 3 rotates can become smaller than that of a comparative structure in which the first distance $D_1$ is smaller than the second distance $D_2$, That is to say, according to the reverse input cut-off clutch 1 in this example, the rotation angle of the input member 3 until the input-side engaging parts 9 and the input-side engaged parts 17 come into contact from a gate in which the pair of pressing surfaces 13 are brought into contact with the pressed surface 6 and the input-side engaging parts 9 are positioned at the central positions of the input-side engaged parts 17 in the second direction can be made smaller than in the comparative structure.

In addition, in the reverse input cut-off clutch 1 in this example, in the locked state or the semi-locked state, the contact portion $C_1$ is located closer to the rotation center O of the output member 4 than the imaginary straight line L in the first direction. For this reason, also when the rattling of the input member 3 is prevented by making the first distance $D_1$ lager than the second distance $D_2$, it is possible to smoothly switch from the locked state or the semi-locked state to the unlocked state or the semi-unlocked state. The reason for this will be explained with reference to FIGS. 6A and 6B.

If a counterclockwise rotational torque is input to the input member 3 in the locked state or the semi-locked state of the reverse input cut-off clutch 1, each of the engaging elements 5 tends to rotate in a counterclockwise direction about the contact portion $C_1$ (first contact portion in the claims).

Figure 6A:
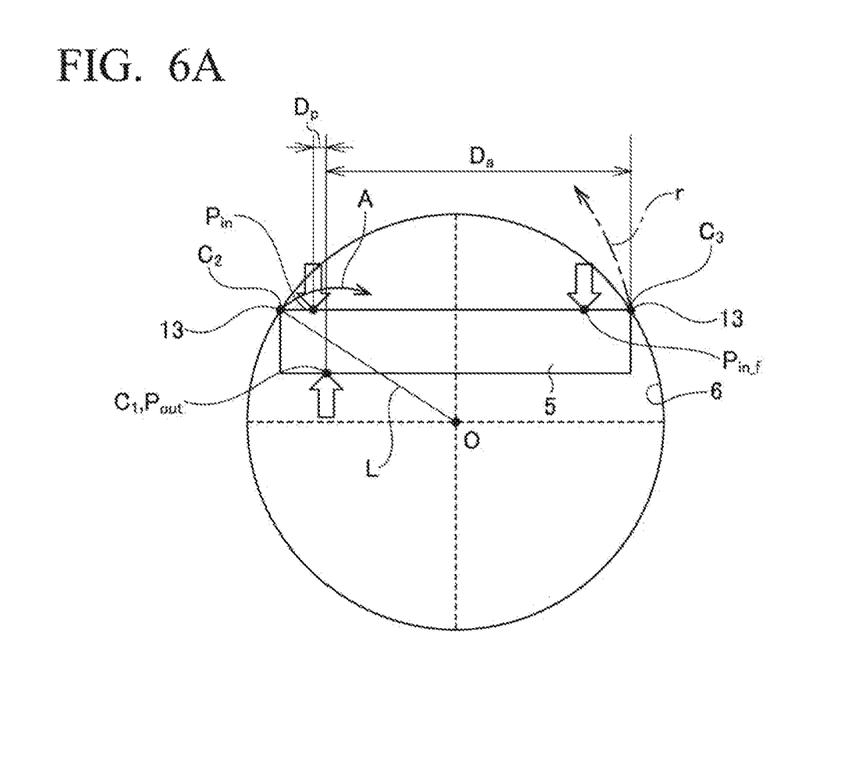
FIG. 6A is a schematic diagram for explaining the effect of the reverse input cut-off clutch according to the example of the embodiment.
Figure 6B:
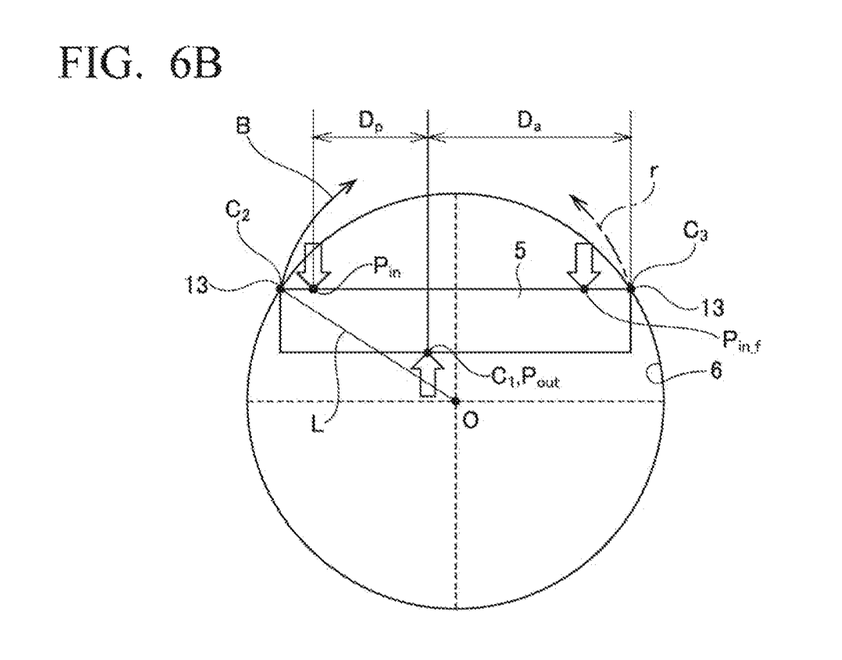
FIG. 6B is a schematic diagram for explaining the effect of the reverse input cut-off clutch according to the example of the embodiment.

When the contact portion $C_1$ is located farther from the rotation center O of the output member 4 than the imaginary straight line L in the first direction, as shown in FIG. 6B, if a counterclockwise rotational torque is input to the input member 3, each of the engaging elements 5 tends to rotate in a counterclockwise direction about the contact portion $C_1$. Furthermore, as in a trajectory r indicated by an alternate long and short dash line in FIG. 6B, the other pressing surface 13 of the pair of pressing surfaces 13 located on the opposite side (the right side in FIG. 6B) with respect to the contact portion $C_1$ across the rotation center O of the output member 4 in the second direction tends to be strongly pressed against the pressed surface 6.

That is to say, when the contact portion $C_1$ is located farther from the rotation center O of the output member 4 than the imaginary straight line L in the first direction, a distance (force point distance) $D_p$ in the second direction between the contact portion $C_1$ that is a fulcrum and a contact portion $P_{in}$ that is a force point is relatively large. On the other hand, a distance (action point distance) D a in the second direction between the contact portion $C_1$ and a contact portion $C_3$ (third contact portion in the claims) between the pressed surface 6 that is an action point and the other pressing surface 13 becomes relatively smaller. Thus, due to the principle of leverage, a force for pressing the other pressing surface 13 against the pressed surface 6 increases and the other pressing surface 13 tends to bite into the pressed surface 6. In order to release the other pressing surface 13 from biting into the pressed surface 6 as described above, at the time of switching from the locked state or the semi-locked state to the unlocked state or the semi-unlocked state, the rotational torque of the input member 3 momentarily becomes excessive. That is to say, the instantaneous maximum torque (peak torque) of the input-side mechanism for rotationally driving the input member 3 becomes excessive.

On the other hand, also when the contact portion $C_1$ located closer to the rotation center O of the output member 4 than the imaginary straight line L in the first direction as in the reverse input cut-off clutch 1 in this example, if a counterclockwise rotational torque is input to the input member 3 as shown in FIG. 6A, each of the engaging elements 5 tends to rotate in a counterclockwise direction about the contact portion $C_1$. Furthermore, as in the trajectory r indicated by the alternate long and short dash line in FIG. 6A, the other pressing surface 13 of the pair of pressing surfaces 13 located on the opposite side (the right side in FIG. 6A) of the contact portion $C_1$ across the rotation center O of the output member 4 in the second direction tends to be pressed against the pressed surface 6.

Since the contact portion $C_1$ is located closer to the rotation center O of the output member 4 than the imaginary straight line L in the first direction in this example, the distance (force point distance) $D_p$ in the second direction between the contact portion $C_1$ that is a fulcrum and the contact portion Pi n that is a force point can become smaller than that of the structure shown in FIG. 6B. Furthermore, the distance (action point distance) Da in the second direction between the contact portion $C_1$ and the contact portion $C_3$ between the pressed surface 6 that is an action point and the other pressing surface 13 can become larger than that of the structure shown in FIG. 6B. For this reason, a force for pressing the other pressing surface 13 against the pressed surface 6 becomes smaller than that of the structure shown in FIG. 6B and the other pressing surface 13 is less likely to bite into the pressed surface 6. Thus, the peak torque of the input-side mechanism at the time of switching from the locked state or the semi-locked state to the unlocked state or the semi-unlocked state can be minimized to be smaller than that of the structure shown in FIG. 6B. As a result, it is possible to smoothly switch from the locked state or the semi-locked state to the unlocked state or the semi-unlocked state. Furthermore, since the peak torque can be minimized to be smaller, the efficiency of torque transmission from the input member 3 to the output member 4 can be ensured satisfactorily and the need to increase the maximum output torque of the input-side mechanism is eliminated. Thus, it is possible to prevent useless enlargement of the input-side mechanism.

In the example shown in FIG. 6A, in a state (the second state) in which a rotational torque is reversely input to the output member 4 and the pair of pressing surfaces 13 are in contact with the pressed surface 6, a contact portion between the output-side engaging part 12 and the output-side engaged part 14 is referred to as a first contact portion (contact portion C1 in FIG. 6A). Furthermore, a contact portion between the input-side engaging part 9 and the input-side engaged part 17 is referred to as a second contact portion (contact portion Pin in FIG. 6A). In addition, a contact portion between the other pressing surface 13 of the pair of pressing surfaces 13 located on the opposite side of the first contact portion across the rotation center of the output member 4 in the second direction and the pressed surface 6 is referred to as a third contact portion (contact portion C3 in FIG. 6A). At this time, it is preferable that a force point distance (distance Dp in FIG. 6A) that is a distance between the first contact portion and the second contact portion in the second direction be smaller than ⅓ of an action point distance (distance Da in FIG. 6A) that is a distance between the first contact portion and the third contact portion in the second direction. With such a constitution, the pressing surface 13 is less likely to bite into the pressed surface 6. Thus, also at the time of switching from the locked state or the semi-locked state to the unlocked state or the semi-unlocked state, the rotational torque of the input member 3 does not increase momentarily and switching from the locked state or the semi-locked state to the unlocked state or the semi-unlocked state can be performed more smoothly. Therefore, unlockability when the input member 3 is rotated in a counterclockwise direction is improved.

Moreover, in the reverse input cut-off clutch 1 in this example, in the locked state or the semi-locked state, the contact portion $C_1$ is located closer to the rotation center O of the output member 4 than the imaginary straight line L in the first direction. For this reason, also when the input member 3 is rotated in a clockwise direction, it is possible to smoothly switch from the locked state or the semi-locked state to the unlocked state or the semi-unlocked state. The reason for this will be explained with reference to FIGS. 6A and 6B again.

If a clockwise rotational torque is input to the input member 3 in the locked state or the semi-locked state of the reverse input cut-off clutch 1, each of the engaging elements 5 tends to rotate in a clockwise direction about the contact portion $C_1$.

When the contact portion $C_1$ is located farther from the rotation center O of the output member 4 than the imaginary straight line L in the first direction, as shown in FIG. 6B if a clockwise rotational torque is input to the input member 3, a force acts on a contact portion $P_{in\_f}$ between the engaging element 5 that is a force point and the input member 3 and the contact portion $C_2$ that is an action point tends to rotate in a clockwise direction about the contact portion $C_1$ that is a fulcrum of the engaging element 5. At this time, the engaging element 5 has the contact portion $C_1$ as a center and the contact portion $C_2$ tends to rotate along a circular arc having, as a radius, between the contact portion $C_1$ and the contact portion $C_2$. Furthermore, as in a trajectory indicated by an arrow B in FIG. 6B, one pressing surface 13 of the pair of pressing surfaces 13 located on the same side (the left side in FIG. 6B) as the contact portion $C_1$ in the second direction is strongly pressed against the pressed surface 6 and tends to be bite into the pressed surface 6.

In order to release the pressing surface 13 from biting, into the pressed surface 6 as described above, at the time of switching from the locked state or the semi-locked state to the unlocked state or the semi-unlocked state, the rotational torque of the input member 3 momentarily increases (peak torque is generated).

Therefore, the one pressing surface 13 is likely to bite into the pressed surface 6 and a peak torque is generated so that unlockability when the input member 3 is rotated in a clockwise direction deteriorates.

On the other hand, when the contact portion $C_1$ is located closer to the rotation center O of the output member 4 than the imaginary straight line L in the first direction as in the reverse input cut-off clutch 1 in this example, if a clockwise rotational torque is input to the input member 3 as shown in FIG. 6A, a force acts on the contact portion between the engaging element 5 that is a force point and the input member 3 and the contact portion that is an action point tends to rotate in a clockwise direction about the contact portion that is a fulcrum of the engaging element 5. At this time, the engaging element 5 has the contact portion as a center and a contact portion $C_2$ tends to rotate along a circular arc having, as a radius, between the contact portion $C_1$ and the contact portion $C_2$.

In this example shown in FIG. 6A, a distance between the contacts of the contact portion $C_1$ and the contact portion $C_2$ is smaller than that in the case of FIG. 6B. Thus, as indicated by the trajectory of the pressing surface 13 indicated by the arrow A, the trajectory of the contact portion $C_2$ passes through further inward from the engaging element 5 than the pressing surface 13 of the engaging element 5. For this reason, the pressing surface 13 is not pressed against the pressed surface 6. That is to say, the pressing surface 13 is less likely to bite into the pressed surface 6. For this reason, also at the time of switching from the locked state or the semi-locked state to the unlocked state or the semi-unlocked state, the rotational torque of the input member 3 does not increase momentarily and it is possible to smoothly switch from the locked state or the semi-locked state to the unlocked state or the semi-unlocked state. Therefore, unlockability when the input member 3 is rotated in a clockwise direction is improved. Furthermore, since a peak torque is not generated, it is not necessary to unnecessarily increase the maximum output torque of the input-side mechanism and it is possible to prevent unnecessary enlargement of the input-side mechanism.

According to the reverse input cut-off clutch 1 in this example, like the reverse input cut-off clutch described in the PCT International Publication No. WO 2021/054481 pamphlet, a structure in which it is possible to smoothly switch from a locked state of a semi-locked state to an unlocked state or a semi-unlocked state can be realized without making a configuration of the engaging element have an engaging element main body and a link member. For this reason, the number of parts can be reduced and the producing costs can be minimized. Although the contact portions $P_{in}$ and $P_{in\_f}$ and the contact portion $C_2$ are positioned at the same height in the first direction in FIGS. 6A and 6B, even when the positions of the contact portions $P_{in}$ and $P_{in\_f}$ and the contact portion $C_2$ in the first direction are different, the same effects as those described above can be obtained.

When implementing the reverse input cut-off clutch of the present invention, the number of engaging elements can be one or three or more.

Also, when implementing the reverse input cut-off clutch of the present invention, it is also possible to provide an elastic member which elastically biases the engaging element in a direction in which the pair of pressing surfaces are brought closer to the pressed surface. The elastic member can be composed of, for example, a torsion coil spring, a leaf spring, or the like. When the pair of engaging elements are provided and the elastic member is composed of a torsion coil spring, the torsion coil spring can also be held by inserting the convex portions (convex portions 16 shown in FIGS. 1 and 3 to 5 in this example) provided on the engaging element into an end portion of the torsion coil spring.

Also, materials of the input member, the output member, the pressed member, and the engaging element are not particularly limited. For example, these materials may be metals such as iron alloys, copper alloys, and aluminum alloys, and synthetic resins mixed with reinforcing fibers as necessary. Furthermore, the input member, the output member, the pressed member, and the engaging element may be made of the same material or different materials.

Moreover, when the rotational torque is reversely input to the output member, as long as the output member satisfies the conditions for locking or semi-locking, a lubricant can be provided in the portions in which the input member, the Output member, the pressed member; and the engaging element conic into contact with each other. For this reason; for example, at least one of the input member, the output member, the pressed member, and the engaging element can be made of oil-impregnated metal.

REFERENCE SIGNS LIST

1 Reverse input cut-off clutch
2 Pressed member
3 input member
4 Output member
5 Engaging element
6 Pressed surface
7 Substrate part
8 Input shaft part
9 Input-side engaging part
9a Radial inner surface
9b Radial outer surface
9c Circumferential side surface
10a Input-side connecting part
10b Output-side connecting part
11 Output shaft part
12 Outputside engaging part
12a Flat surface
12b Convex surface
13 Pressing surface
14 Outputside engaged part
15 Flat surface portion
16 Convex portion.
17 Input-side engaged part
17a Flat surface
18 Flange part

What is claimed is:

1. A reverse input cut-off clutch comprising:
a pressed member that includes a pressed surface provided on an inner peripheral surface;
an input member having at least one input-side engaging part disposed radially inside the pressed surface and disposed coaxially with the pressed surface;
an output member having an output-side engaging part disposed further inward in a radial direction than the input-side engaging part radially inside each of the pressed surface and disposed coaxially with the pressed surface; and
an engaging element having a pair of pressing surfaces facing the pressed surface and away from each other in a circumferential direction, an input-side engaged part which is engageable with the input-side engaging part, and an output-side engaged part which is engageable with the output-side engaging part, and disposed to be movable in a first direction that is a far-near direction with respect to the pressed surface,
wherein, the engagement element is configured to be displaced in a direction moving away from the pressed surface in the first direction based on that the input-side engaging part engages with the input-side engaged part when a rotational torque is input to the input member and is configured to transmit the rotational torque input to the input member to the output member based on that the output-side engaged part engages with the output-side engaging part,
the engagement element is configured to press the pressing surface against the pressed surface so that the pressing surface frictionally engages with the pressed surface based on that the output-side engaging part engages with the output-side engaged part when a rotational torque is reversely input to the output member,
a state in which, as the output member rotates in a predetermined direction, the pair of pressing surfaces are pressed against the pressed surface, and as the input member rotates in a direction opposite to the predetermined direction, the input-side engaging part is engaged with the input-side engaged part is set to be a first state, and
a state in which a rotational torque is reversely input to the output member and the pair of pressing surfaces are in contact with the pressed surface is set to be a second state,
when a direction perpendicular to both the first direction and a central axis of the input member is set to be a second direction,
wherein in the first state, a distance in the second direction between a contact portion between the input-side engaging part and the input-side engaged part and a rotation center of the input member is larger than a distance in the second direction between a contact portion between the output-side engaging part and the output-side engaged part and a rotation center of the output member, and
in the second state, the contact portion between the output-side engaging part and the output-side engaged part is located closer to the rotation center of the output member in the first direction than an imaginary straight line connecting a contact portion between one pressing surface of the pair of pressing surfaces and the pressed surface to the rotation center of the output member.

2. The reverse input cut-off clutch according to claim 1, wherein, in the second state, the contact portion between the output-side engaging part and the output-side engaged part is set to be a first contact portion, the contact portion between the input-side engaging part and the input-side engaged part is set to be a second contact portion, and a contact portion between the other pressing surface of the pair of pressing surfaces which is located on an opposite side with respect to the first contact portion across the rotation center of the output member in the second direction and the pressed surface is set to be a third contact portion,
a force point distance that is a distance in the second direction between the first contact portion and the second contact portion is smaller than $1/3$ of an action point distance that is a distance in the second direction between the first contact portion and the third contact portion.

3. The reverse input cut-off clutch according to claim 1, wherein a pair of the engaging elements are provided and the input member has a pair of the input-side engaging parts.

4. The reverse input cut-off clutch according to claim 2, wherein a pair of the engaging elements are provided and the input member has a pair of the input-side engaging parts.

* * * * *